United States Patent [19]

Teich

[11] 3,825,798
[45] July 23, 1974

[54] FLASHER AND DELAY HEADLIGHT CONTROL SYSTEM

[76] Inventor: Rudor M. Teich, 6040 Blvd., East, West New York, N.J. 07093

[22] Filed: June 4, 1973

[21] Appl. No.: 366,698

[52] U.S. Cl. .............................. 315/83, 307/10 LS
[51] Int. Cl. ............................................ B60q 1/06
[58] Field of Search ...................... 315/82, 83, 83.1; 307/10 LS

[56] References Cited
UNITED STATES PATENTS
3,305,695  2/1967  Lato .................................... 315/82
3,671,802  6/1972  Ballou ................................. 315/83

Primary Examiner—Herman Karl Saalbach
Assistant Examiner—James B. Mullins

[57] ABSTRACT

There is disclosed an auxiliary circuit for connection to the electrical system of an automobile for controlling headlight flashing and delay functions. When the headlight switch is off, operation of the dimmer foot switch causes the headlights to be turned on for a brief interval. During daylight driving, when the ignition switch is on, each operation of the dimmer foot switch causes the headlights to flash on for ½ second to attract the attention of a driver of a car in front. When the ignition switch is off, for example, after the car has been parked in a driveway, the operation of the dimmer foot switch causes the headlights to turn on for one minute to illuminate the driveway while the driver enters his house. In both cases, no additional switches or knobs are required — the dimmer foot switch, which ordinarily serves no function when the headlight switch is off, can be used to control both of the new headlight functions; which of the two headlight functions is controlled depends on the position of the ignition switch.

23 Claims, 1 Drawing Figure

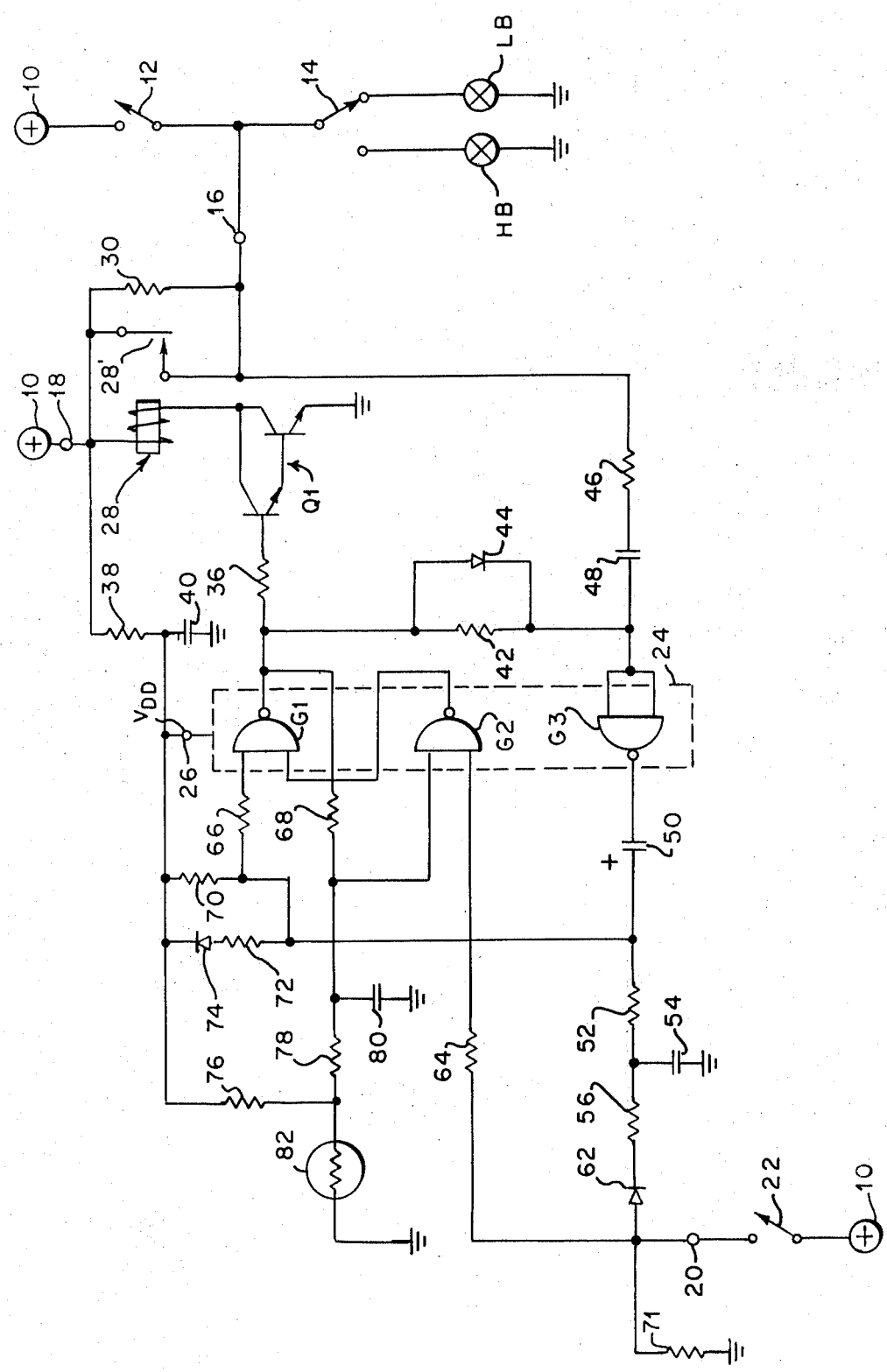

FLASHER AND DELAY HEADLIGHT CONTROL SYSTEM

This invention relates to flasher and delay control circuits for automobile headlights, and more particularly to such circuits which are controlled by the dimmer foot switch.

The headlight electrical system of a conventional automobile is relatively simple in both design and function. Each headlight is provided with high-beam and low-beam filaments, one end of each filament being connected to the chassis ground. A dimmer foot switch is provided for connecting the other ends of either the high-beam filaments or the low-beam filaments through the headlight switch to the car battery. Thus the headlights can be turned on when the headlight switch is closed, and the filaments through which currents flow depend upon the position of the dimmer foot switch.

Headlights are used for purposes other than illuminating the road during travel. For example, blinking or flashing headlights are used to signal a driver in front even during daylight driving; the sudden reflection of the headlights in the rear-view mirror of the forward car usually attracts its driver's attention. On a conventional American-made car, the only way to control the flashing of the headlights for this purpose is to alternately turn the headlight switch on and off.

Another use of automobile headlights is to illuminate a driveway or garage as one leaves a car after it has been parked. Of course, the headlights should not remain on indefinitely or else the battery will be drained. For this reason, there have been proposals to provide delay circuits for controlling the turning on of the headlights for a pre-set time interval. After parking the car and turning the ignition switch off, the driver may turn on a specially provided (non-standard) switch which controls the turning on of the headlights for a pre-set interval, for example, one minute.

Although special circuits have been proposed for the flashing and time-delay headlight functions just described, as well as for controlling other uses of the headlights, it is generally necessary to provide special additional switches for these purposes. Since the "new" functions to be performed are not among those for which the car is initially equipped, it is necessary to install not only additional circuitry, but also additional switches which can be operated by the driver. While the circuitry, contained in a small module, can usually be installed under the dash and out of view, the switches are often exposed; they may be not only unsightly but may add additional cost to the installation. And drivers who are not familiar with the car may not even know what the switches are for.

It is a general object of my invention to provide a circuit for installation in an automobile for controlling non-standard headlight functions without requiring the provision of additional switches.

Briefly, I utilize the dimmer foot switch to control not only switching between the headlight high-beam and low-beam illuminations, but also to control additional functions when the headlight switch is off. In this way, the module which contains the circuitry of my invention can be installed under the dash unexposed to view, and there is no requirement to install additional switches.

When the headlight switch is off, the dimmer foot switch is connected through either the low-beam filaments, or the high-beam filaments, to ground. If the foot switch is operated and its contact switches over to the other filaments (in the two headlights), there is a momentary break in the ground connection. This is of no significance with conventional automobile wiring, however, because the ground connection is immediately re-established, and in any event the ground connection serves no purpose; the other end of the foot switch contact is connected to the headlight switch and it is open. But, in accordance with the principles of my invention, I use this momentary removal of ground to control additional functions.

The momentary break in the ground connection to the foot switch is used to trigger a one-shot multivibrator. When the multivibrator is on, the foot switch contact is connected to the car battery through a path other than that which includes the headlight switch. Consequently, either the low beams or high beams turn on, depending upon the position of the foot switch contact. At the end of the multivibrator "on" time, the headlights turn off. Thus, when the headlight switch is off, it is the movement of the foot switch contact from one of the filament circuits to the other that triggers the multivibrator, following which the filament circuit to which the foot switch contact is newly moved is energized for a pre-set time interval by the car battery.

Two connections are made between the multivibrator and the car battery. One of these connections is a direct connection, and the other is through the ignition switch. When the ignition switch is on, both supply circuits to the multivibrator are operative and they control the multivibrator period to be ½ second. When the ignition switch is off, only the direct battery connection to the multivibrator is operative, and it controls the multivibrator period to be 1 minute.

During driving, the ignition switch is, of course, on. Consequently, each time that the foot switch is operated, the headlights turn on for ½ second. Continued operations of the dimmer foot switch result in successive flashings of the headlights (alternate flashing of the high beams and the low beams). Thus, when driving, the driver can attract the attention of a driver in front of him simply by continuously stepping down on the dimmer foot switch — even though the headlight switch remains off. (In fact, the additional functions controlled by the dimmer foot switch described above cannot be accomplished in the illustrative embodiment of the invention if the headlight switch is on.) After parking his car in a driveway, the driver turns the ignition switch off. If at this time the dimmer foot switch is operated, the multivibrator and the headlights turn on for 1 minute. This is generally a sufficient period of time to illuminate the driveway while the driver enters his house. Thus all that is required to illuminate the driveway for a brief interval is for the driver to press down just once on the foot switch as he leaves the car.

In the illustrative embodiment of the invention, two distinct additional functions can be served by the headlights without requiring additional switches. Not only are the costs of the system lowered, but the driver need not be concerned about additional switches as well. The easily operated dimmer foot switch controls the new functions — functions not originally contemplated for the switch but which can be controlled when the headlight switch is off and the foot switch would otherwise serve no purpose.

Because the headlight switch is by-passed by the circuit of my invention, there is yet another headlight function which can be accomplished at very little additional cost. A photocell is provided for detecting the ambient illumination. When it is dark, the photocell functions to hold the multivibrator in a permanent on state, to thus control the permanent turning on of the headlights. If the dimmer foot switch happens to be operated at such a time, it does not trigger the multivibrator since the multivibrator is permanently on. Instead, the dimmer foot switch functions in its ordinary capacity of switching between the high beams and the low beams.

It is a feature of my invention to provide a circuit for connection to the headlight system of a vehicle, which circuit does not require additional switches but permits the dimmer foot switch to control additional headlight functions when the headlight switch is off and the dimmer foot switch would otherwise serve no purpose.

Further objects, features and advantages of my invention will become apparent upon consideration of the following detailed description in conjunction with the drawing which depicts the illustrative embodiment of the invention.

To the right of the drawing there is shown the conventional automobile headlight circuit. The element identified by the numeral HB represents the high-beam filaments connected in parallel, as the element represented by the symbol LB represents a parallel connection of the low-beam filaments. One end of each filament is grounded. The other end of each of the filament circuits can be connected through dimmer foot switch contact 14 and through headlight switch 12 to the car battery 10. It is apparent that the headlights cannot operate unless the headlight switch 12 is closed. Once the switch is operated, the driver can control a change-over from the high beams to the low beams, or vice versa, by pressing down on the dimmer foot switch, thereby switching over contact 14 from one filament circuit to the other.

Switch 22 represents the ignition switch of the vehicle. When the switch is closed, the battery voltage is extended to various points in the electrical system of the car. Terminal 20 represents any convenient tap-off point which is connected through the ignition switch to the car battery.

The circuit of the drawing may be contained in a metallic case. The circuit ground connection may be made to the metallic case, and the connection to the ground of the electrical system of the car can be effected by mounting the metallic case to a grounded mount on the car. Preferably, a separate ground connection is made to the electrical system. In addition to the ground connection, the circuit of my invention requires three connections to the electrical system of the car, these connections being shown at terminals 16, 18 and 20. The first connection at terminal 16 is to a point between headlight switch 12 and dimmer switch 14. The second connection at terminal 18 is a direct connection to the positive terminal of car battery 10. The third connection at terminal 20 is to a point in the electrical system of the vehicle which is connected through ignition switch 22 to the car battery.

The resistance of resistor 30 is 10k. Consequently, in the quiescent state the current drawn from battery 10 through resistor 30, foot switch 14, and one of the filament circuits is inconsequential; there is little battery drain and no headlight illumination. Contacts 28' are open in the quiescent state so that the headlights remain off.

The three NAND gates G1, G2 and G3 are contained in the same integrated circuit module 24. As is known in the art, the output of each NAND gate is high unless both of its inputs are high. Terminal 26 is the pin on the module 24 to which the supply potential $V_{DD}$ is connected. The supply potential is taken across capacitor 40, which capacitor is charged through resistor 38 from the car battery. When the output of one of the gates is high, its potential is close to the magnitude of $V_{DD}$. When a gate output is low, its potential is close to ground.

The operation of the circuit in the "delay" mode will be described first. With ignition switch 22 open, the lower input of gate G2 is disabled and the gate output is high. This output enables one input of gate G1. In the quiescent state, the $V_{DD}$ potential is extended through resistors 70 and 66 to the other input of gate G1 to force the output of the gate to remain low. This low potential is extended through resistor 42 to both inputs of gate G3 whose output in the quiescent state is thus high. Gates G1 and G3 comprise a one-shot multivibrator with the output of gate G1 being normally low and the output of gate G3 being normally high. In the quiescent state, capacitor 50, which is poled in the direction shown, has no charge across it because one side of the capacitor is connected to the high output of gate G3 and the other side of the capacitor is connected through resistor 70 to the $V_{DD}$ supply. Capacitor 48 is similarly discharged; one side of the capacitor is connected through resistor 42 to the low output of gate G1 and the other side of the capacitor is connected through resistor 46 to terminal 16 which is near ground because the impedance of resistor 30 is so much greater than the impedance of the filaments.

When the dimmer foot switch is operated as the driver leaves the car, contact 14 disengages from one of the filament circuits before it engages the other. In other words, the ground potential at terminal 16 is momentarily removed. At this time, the terminal rises in potential by virtue of its connection to battery 10 through resistor 30, and a positive step is transmitted through capacitor 48 to the two inputs of gate G3. The output of the gate goes low and a negative step is transmitted through capacitor 50 and resistor 66 to one of the inputs of gate G1. Consequently, the output of the gate goes high and this high potential is extended through resistor 42 and diode 44 to the two inputs of gate G3. Thus even though the potential at terminal 16 returns to ground as soon as contact 14 engages the new filament circuit, the two inputs to gate G3 remain high. Once the multivibrator is triggered, the output of gate G1 remains high and the output of gate G3 remains low even though terminal 16 is once again returned to ground through one of the filament circuits.

In the case of a 12-volt car battery, $V_{DD}$ is close to 12 volts, and the output of each of the NAND gates is at a level of either zero volts or 12 volts. Preferably, the gates are of the CMOS type in order to minimize the battery drain and for maximum noise immunity. The triggering level at the input of such a gate is approximately 6 volts. When the output of gate G3 first goes low, since capacitor 50 was initially discharged, the junction of resistor 52 and capacitor 50 drops to ground potential. It is this ground potential extended through resistor 66 which first causes the output of gate G1 to go high. Immediately, current flows from the battery, through resistors 38 and 70, and capacitor 50, to the low impedance output of gate G3. This current charges capacitor 50 so that the potential at the junction of the capacitor and resistor 52 starts to rise. As soon as the potential rises to a level of approximately 6 volts, since this potential is extended through resistor 66 to the previous low input of gate G1, the output of gate G1 once again goes low and the multivibrator returns to its quiescent state. Since ignition switch 22 is off, no current is supplied through switch 22 to charge capacitor 50, and all of the charging current flows through resistor 70. (Diode 62 is reverse biased so that no voltage dividing action takes place between resistors 70, 52, 56 and 71; without the diode, terminal 20, which is connected to various points in the electrical system of the vehicle, would have its potential pulled down near to the ground level.) Resistor 70 is large in magnitude and it requires approximately one minute for the voltage at the junction of resistor 52 and capacitor 50 to rise to that level which causes the output of gate G1 to go low. It is during this one-minute charging interval, that is, while the multivibrator is in its on state, that the headlights remain on. As long as the output of gate G1 is high, this potential is extended through resistor 36 to the base of the first transistor in the Darlington pair Q1. A Darlington pair is used in order to supply sufficient operating current for relay 28. The high potential at the base input of transistor pair Q1 turns these transistors on so that current flows from the battery through the sinding of relay 28 and the transistors. The relay operates and closes contacts 28'. It is when these contacts are closed that the battery voltage is extended through the contacts and the dimmer foot switch 14 to one of the headlight circuits. It is the closing of contacts 28' that by-passes resistor 30 to turn on the headlights.

Just before the multivibrator returns to its stable (off) state, the output of gate G3 is still at ground potential but capacitor 50 has charged to just under the triggering level of gate G1, namely, to approximately 6 volts. As soon as the multivibrator returns to its quiescent state, the output of gate G3 jumps to 12 volts, so that the junction of resistor 52 and capacitor 50 rises to an 18-volt level. Without resistor 72 and diode 74, capacitor 50 would then discharge through resistor 70 until the junction of the capacitor and resistor 52 returned to the $V_{DD}$ level of 12 volts. When the ignition switch 22 is open and the headlights are to remain on for 1 minute, this is of little concern because there is no need to operate the foot switch once again. But when the headlights are to be flashed continuously (when the ignition switch is on) as will be described below, the foot switch may be operated continuously by the driver and each time that it is operated the multivibrator must be triggered. If there is no way for capacitor 50 to discharge rapidly, when the output of gate G3 next drops to zero volts when the foot switch is operated the left side of capacitor 50 would only drop to 6 volts which is insufficient for changing the state of gate G1. This would prevent another immediate triggering of the multivibrator. For this reason, a fast discharge circuit is provided for capacitor 50. When the multivibrator returns to its quiescent state and the junction of capacitor 50 and resistor 52 is at 18 volts, diode 74 is forward biased and the capacitor rapidly discharges through resistor 72 and the diode to the $V_{DD}$ level.

During driving, ignition switch 22 is closed. However, in the quiescent state, capacitor 54 is charged to the $V_{DD}$ level (the capacitor charging through resistors 52 and 70). Consequently, the quiescent voltages described above are the same whether or not switch 22 is closed. However, as soon as the output of gate G3 goes low following the operation of the foot switch, the multivibrator turns on and the junction of capacitor 50 and resistor 52 drops to ground potential. Capacitor 50 now charges not only from current through resistor 70, but also from current which flows from battery 10 switch 22, diode 62, and resistors 56 and 52. Consequently, the capacitor charges more rapidly so that the multivibrator remains on for a shorter interval. It is when the ignition switch is closed that the flashing function is required, that is, a brief (e.g., ½ second) energization of the headlights for each operation of the foot switch. As described above, it is during the flashing of the headlights that capacitor 50 must discharge rapidly in preparation for another triggering of the multivibrator, and it is for this reason that resistor 72 and diode 74 are provided to by-pass resistor 70. The "dead" interval between the termination of a flash and the initiation of a new flash (provided the foot switch is operated) depends on the magnitude of resistor 72, that is, on how fast it allows capacitor 50 to discharge. Typically, the "dead" interval may be adjusted to be approximately 50 milliseconds. Even if contacts 28' bounce when they are released, a momentary positive potential which may be extended through them to the inputs of gate G3 cannot trigger the multivibrator; the bouncing stops prior to the expiration of 50 milliseconds. Thus there can be only one flash for each operation of the foot switch.

An integrated circuit module 24 typically contains several NAND gates. For example, the RCA CD4011AE module contains four such gates. Only two of the gates are required for the multivibrator. In the illustrative embodiment of the invention, one of the remaining gates (G2) is used to control the automatic turning on of the headlights even if headlight switch 12 is open when it becomes dark. The impedance of photocell 82 varies inversely with the intensity of the light which impinges on it. During daytime, even though the $V_{DD}$ supply is impressed across resistor 76 and photocell 82 in series, most of the drop is across resistor 76. Consequently, the junction of resistors 76 and 78 is at a low potential. This low potential is extended through resistor 78 to one input of gate G2 so that its output remains high to enable gate G1 if the multivibrator is triggered. But as it gets darker, the resistance of photocell 82 increases, there is a greater drop across it, and the potential at the junction of resistors 76 and 78 rises. Since ignition switch 22 is closed (the only time that automatic turn-on of the headlights is desirable is when the car is in use), the potential of battery 10 is extended through resistor 64 to one input of gate G2. As soon as the potential drop across the photocell rises to approximately 6 volts, the output of gate G2 goes low since both of its inputs are now high. Thus the output of gate G1 goes high, and remains high, in order to control the energization of relay 28. Contacts 28' close and the headlights are permanently turned on. The operation of foot switch 14 at this time simply switches the current between the high beam and low beam filaments as is the usual case when the headlights are turned on.

It should be noted that the source potential for photocell 82 is the $V_{DD}$ supply at terminal 26. The magnitude of $V_{DD}$, of course, depends upon the battery voltage and can vary appreciably. But because the $V_{DD}$ supply is also used as the source potential for the chip containing the several gates, and the input switching level of a gate varies with the magnitude of $V_{DD}$, the same light intensity level controls the turn-on of the headlights within a relatively wide voltage range. What is important for the automatic headlight turn-on is the impedance of photocell 82 relative to the impedance of fixed resistor 76, rather than the actual voltage across the photocell.

There are times when it may get dark in the car but when the headlights should not turn on automatically. For example, in driving under an overpass, the impedance of photocell 82 may rise to the triggering level, but it may not be required to turn on the headlights if the car soon leaves from under the overpass. For this reason, capacitor 80 is included in the circuit to provide a short delay of approximately 30 seconds after the impedance of photocell 82 rises to the triggering level before the headlights turn on automatically. The potential across capacitor 80 is initially determined by the low impedance of the photocell. Although the impedance of the photocell may rise instantaneously, it takes approximately 30 seconds until capacitor 80 charges to that level which causes the output of gate G1 to go high.

The connection of resistor 68 from the output of gate G1 to that input of gate G2 which is controlled by the photocell provides a hysteresis effect. The feedback prevents the headlights from switching on and off under marginal circumstances where the light level fluctuates and the impedance of photocell 82 might otherwise continuously rise above the fall below the triggering level. As soon as it gets dark enough so that the potential across capacitor 80 (determined by the impedance of the photocell) is sufficiently high to cause the output of gate G2 to go low and the output of gate G1 to go high, the high potential of the output of gate G1 is extended back through resistor 68 to the junction of capacitor 80 and resistor 78. This feedback raises the potential across the capacitor. Before the headlights turn off automatically, the impedance of the photocell must fall to a level below the level which caused the headlights to go on in the first place. Similarly, once it gets light enough so that the voltage across capacitor 80 falls to a level at which the output of gate G1 goes low, the ground potential extended through resistor 68 to the capacitor further decreases the voltage across it. Before the lights turn on automatically once again, the intensity of the light striking the photocell must decrease below the level which first caused the headlights to turn off.

An inherent feature of the gates included in the circuit is that their input impedances are capacitive. This is used to advantage by providing high-impedance resistors in series with the gate inputs, so as to form low-pass filters. For example, if resistor 46 is large in magnitude, the effective low-pass filter at the inputs of gate G3 makes the multivibrator less sensitive to triggering by stray high-frequency spikes. Also, the gates are provided with internal low-power clamping diodes; the large-magnitude series resistors prevent the diodes from burning out in the presence of large transients. Such large transients may be generated, for example, when ignition switch 22 is turned on. It is for this reason that resistors 46, 64 and 66 should be large in magnitude.

The functions of several of the elements shown in the drawing have not been described thus far, but the purpose of including them in the circuit should be understood. The output of gate G1 is coupled to the inputs of gate G3 by resistor 42. The output of gate G1 exhibits a low impedance, and if resistor 42 is also a low impedance, especially when resistor 46 is a high impedance, it is apparent that most of the voltage drop from battery 10 will be developed across resistor 46, rather than resistor 42. This, in turn, would result in a very low-level pulse at the inputs of gate G3 when foot switch 14 is operated. It is for this reason that resistor 42 should be large in magnitude (e.g., 10M). But if resistor 42 is very large in magnitude, when the multivibrator is first triggered and the output of gate G1 goes high, the voltage level applied to the inputs of gate G3 may be too low to hold the output of the gate down. It is for this reason that diode 44 is provided — to by-pass resistor 42 so that the output of gate G1, when it is high, is coupled directly through the diode to the inputs of gate G3.

The purpose of resistor 38 and capacitor 40 is to provide a filter acrss which the $V_{DD}$ supply is taken. Such a filter is standard for developing a potential source for integrated circuits and it serves to filter out fast battery fluctuations and noise.

The lower input of gate G2 is energized solely by the ignition switch being turned on. The lower input of gate G2 is provided in the first place because if the ignition switch is off, the output of gate G2 must remain high so that photocell 82 cannot control turn-on of the headlights even if it is dark. Resistor 71 ensures that a ground potential is applied to the lower input of gate G2 when the ignition switch is off.

The function of resistor 36 is to prevent transistors Q1 from loading the output of gate G1.

Capacitor 54 functions as a filter together with resistor 56 to prevent high-frequency changes in the battery voltage from being extended through resistor 66 to the respective input of gate G1. Resistor 52 is a buffer resistor separating capacitors 50 and 54; without this resistor, when the output of gate G3 goes low, capacitor 54 would prevent the low potential from being instantly extended through resistor 66 to the respective input of gate G1.

In the preferred embodiment of the invention, the following components and component values are used:

| | |
|---|---|
| resistor 30: 10k | capacitor 40: 4.7uf |
| resistor 36: 100k | capacitor 48: .02uf |
| resistor 38: 1K | capacitor 50: 10uf |
| resistor 42: 10M | capacitor 54: .05uf |
| resistor 46: 2.2M | capacitor 80: 100uf |
| resistor 52: 15k | |
| resistor 56: 15k | diode 44: 1N645 |
| resistor 64: 10M | diode 62: 4148 |
| resistor 66: 1.5M | diode 74: 1N645 |
| resistor 68: 470k | |
| resistor 70: 10M | transistor Q1: D40C1 |
| resistor 72: 22K | photocell 82: CL7P5HL |
| resistor 76: 15K | relay 28: 31-002 |
| resistor 78: 330K | NAND gates: RCA CD4011AE |
| resistor 71: 1K | |

Although the invention has been described with reference to a particular embodiment, it is to be understood that this embodiment is merely illustrative of the application of the principles of the invention. For example, the circuit disclosed above can be used in those automobiles in which each of the filaments has one end connected directly to the headlight switch, and the dimmer switch connects the other ends of either the high-beam of low-beam filaments to ground; in such a case, the connection at terminal 16 is made to the junction of the headlight switch and the filaments and the circuit functions in the same way. Although the two "new" headlight functions which are controlled in the illustrative embodiment of the invention without requiring the need for additional switches are the "flashing" and "delay" functions, it is contemplated that other functions can be controlled in comparable ways. Furthermore, even the functions described can be implemented in other ways. For example, it is possible to provide a circuit which when triggered while the ignition switch is closed causes the multivibrator to be turned on and off several times in succession. In this way, a controlled flashing sequence could be accomplished by pressing down on the foot switch only once. Also, the turning on of the headlights could be controlled by an auxiliary mechanically-actuated connection to the dimmer switch. In its broad aspects, my invention is an auxiliary control circuit for a lighting system which has a main on-off switch and another switch for determining the mode in which the lighting system is operated. (The lighting system can be in a vehicle, although it need not necessarily be so.) When the main on-off switch is off and the mode selection switch is operated, the lighting system is turned on for a predetermined time interval. Thus it is to be understood that numerous modifications may be made in the illustrative embodiment of the invention and other arrangements may be devised without departing from the spirit and scope of the invention.

What I claim is:

1. An auxiliary control circuit for the headlight system of a vehicle, said vehicle having a battery, said headlight system having high-beam and low-beam filaments one end of each of which is grounded, a dimmer foot switch for selectively establishing a connection to the other end of either said high-beam or low-beam filaments, and a headlight switch connected between the vehicle battery and the dimmer foot switch, said control circuit comprising impedance means connected between said battery and the junction of said headlight and dimmer foot switches, means connected in parallel with said impedance means for selectively connecting said battery to said junction independent of the operation of the headlight switch, means for operating said connecting means for a predetermined time interval, and means connected to said junction and responsive to the momentary jump in potential at said junction when said dimmer foot switch is operated while said headlight switch is off for triggering said operating means whereby the headlight system is turned on for said predetermined time interval.

2. An auxiliary control circuit in accordance with claim 1 wherein said vehicle includes an ignition switch, and further including means for controlling the duration of said predetermined time interval in accordance with the position of said ignition switch.

3. An auxiliary control circuit in accordance with claim 2 wherein said duration controlling means includes means responsive to said ignition switch being closed for controlling said predetermined time interval to have a duration corresponding to that required for flashing a headlight to attract the attention of the driver of another vehicle in front, and responsive to said ignition switch being open for controlling said predetermined time interval to have a duration sufficient to provide illumination as a driver leaves a parked car and enters a house.

4. An auxiliary control circuit in accordance with claim 2 further including means for sensing the ambient illumination and responsive to such illumination falling below a first threshold level for causing said operating means to operate continuously until the illumination level rises above a second, higher threshold level.

5. An auxiliary control circuit in accordance with claim 2 wherein said operating means is a one-shot multivibrator whose period of operation is dependent upon current flow thereto from the vehicle battery, and said duration controlling means includes means for adjusting the current flow from the vehicle battery to said one-shot multivibrator in accordance with the position of said ignition switch.

6. An auxiliary control circuit in accordance with claim 5 which includes four connections to the electrical system of the vehicle in which it is installed, a first of said connections being to the ground potential of the vehicle, a second of said connections being to said dimmer foot switch, a third of said connections being to the vehicle battery for powering the auxiliary control circuit, and the fourth of said connections being to the vehicle battery through said ignition switch for controlling the duration of operation of said one-shot multivibrator in accordance with the position of said ignition switch.

7. An auxiliary control circuit in accordance with claim 1 further including means for sensing the ambient illumination and responsive to such illumination falling below a first threshold level for causing said operating means to operate continuously until the illumination level rises above a second, higher threshold level.

8. An auxiliary control circuit in accordance with claim 1 which includes four connections to the electrical system of the vehicle in which it is installed, a first of said connections being to the ground potential of the vehicle, a second of said connections being to said dimmer foot switch, a third of said connections being to the vehicle battery for powering the auxiliary control circuit, and the fourth of said connections being to the vehicle battery through the vehicle ignition switch for controlling the duration of said predetermined time interval in accordance with the position of said ignition switch.

9. An add-on auxiliary control circuit for the headlight system of a vehicle, said headlight system having a dimmer foot switch for selectively establishing a high-beam or a low-beam filament connection through a headlight switch to the vehicle battery, said dimmer foot switch having a moveable contact therein for transferring between high-beam and low-beam circuits and exhibiting a change in potential during each actuation of said dimmer foot switch, said add-on auxiliary control circuit comprising means for establishing a filament connection to the vehicle battery independent of the operation of the headlight switch, means for operating said connection establishing means for a predetermined time interval, and means coupled to said movable contact and responsive to the potential change exhibited thereby as a result of its transfer while said dimmer foot switch is actuated when said headlight switch is off for triggering said operating means whereby the headlight system is turned on for said predetermined time interval.

10. An auxiliary control circuit in accordance with claim 9 wherein said vehicle includes an ignition switch, and further including means for controlling the duration of said predetermined time interval in accordance with the position of said ignition switch.

11. An auxiliary control circuit in accordance with claim 10 wherein said duration controlling means include means responsive to said ignition switch being closed for controlling said predetermined time interval to have a duration corresponding to that required for flashing a headlight to attract the attention of the driver of another vehicle in front, and responsive to said ignition switch being open for controlling said predetermined time interval to have a duration sufficient to provide illumination as a driver leaves a parked car and enters a house.

12. An auxiliary control circuit in accordance with claim 10 further including means for sensing the ambient illumination and responsive to such illumination falling below a threshold level for causing said operating means to operate continuously until the illumination level rises above a threshold level.

13. An auxiliary control circuit in accordance with claim 10 wherein said triggering means includes means electrically connected between said moveable contact and said operating means, said operating means being triggered by the removal of ground potential from said moveable contact.

14. An auxiliary control circuit in accordance with claim 10 wherein said operating means is a one-shot multivibrator whose period of operation is dependent upon current flow thereto from the vehicle battery, and said duration controlling means includes means for adjusting the current flow from the vehicle battery to said one-shot multivibrator in accordance with the position of said ignition switch.

15. An auxiliary control circuit in accordance with claim 14 which includes four connections to the electrical system of the vehicle in which it is installed, a first of said connections being to the ground potential of the vehicle, a second of said connections being to said dimmer foot switch, a third of said connections being to the vehicle battery for powering the auxiliary control circuit, and the fourth of said connections being to the vehicle battery through said ignition switch for controlling the duration of operation of said one-shot multivibrator in accordance with the position of said ignition switch.

16. An auxiliary control circuit in accordance with claim 9 further including means for sensing the ambient illumination and responsive to such illumination falling below a threshold level for causing said operating means to operate continuously until the illumination level rises above a threshold level.

17. An auxiliary control circuit in accordance with claim 9 wherein said triggering means includes means electrically coupled between said moveable contact and said operating means, said operating means being triggered by the removal of ground potential from said moveable contact.

18. An auxiliary control circuit in accordance with claim 9 which includes four connections to the electrical system of the vehicle in which it is installed, a first of said connections being to the ground potential of the vehicle, a second of said connections being to said dimmer foot switch, a third of said connections being to the vehicle battery for powering the auxiliary control circuit, and the fourth of said connections being to the vehicle battery through the vehicle ignition switch for controlling the duration of said predetermined time interval in accordance with the position of said ignition switch.

19. An add-on auxiliary control circuit for a lighting system, said lighting system having light-emitting means, mode selection switch means for determining and changing the mode in which said lighting system is operated responsive to each actuation thereof, said mode selection switch means having a point therein which exhibits a change in potential during each actuation thereof, a source of potential, and a main on-off switch for controlling the connection of said potential source to said light-emitting means, said add-on auxiliary control circuit comprising means for establishing a connection of said potential source to said light-emitting means independent of the operation of said main on-off switch, means for operating said connection establishing means for a predetermined time interval, and means coupled to said mode selection switch means and responsive to a change in potential at said point therein as a result of the actuation thereof when said main on-off switch is off for triggering said operating means whereby the lighting system is turned on for said predetermined time interval.

20. An auxiliary control circuit in accordance with claim 19 further including means for selectively controlling the duration of said predetermined time interval.

21. An auxiliary control circuit in accordance with claim 20 further including means for sensing the ambient illumination and responsive to such illumination falling below a threshold level for causing said operating means to operate continuously until the illumination level rises above a threshold level.

22. An auxiliary control circuit in accordance with claim 20 wherein said operating means is a one-shot multivibrator whose period of operation is dependent upon current flow thereto from said potential source, and said duration controlling means includes means for adjusting the current flow from said potential source to said one-shot multivibrator.

23. An auxiliary control circuit in accordance with claim 19 further including means for sensing the ambient illumination and responsive to such illumination falling below a threshold level for causing said operating means to operate continuously until the illumination level rises above a threshold level.

* * * * *